US010065586B2

(12) United States Patent
Barbat et al.

(10) Patent No.: US 10,065,586 B2
(45) Date of Patent: Sep. 4, 2018

(54) DEPLOYABLE DEVICE MOUNTED TO VEHICLE FRAME

(71) Applicant: Ford Global Technologies, LLC, Dearborn, MI (US)

(72) Inventors: Saeed David Barbat, Novi, MI (US); Mohammed Omar Faruque, Ann Arbor, MI (US); Dean M. Jaradi, Macomb, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 59 days.

(21) Appl. No.: 15/358,256

(22) Filed: Nov. 22, 2016

(65) Prior Publication Data

US 2018/0141511 A1    May 24, 2018

(51) Int. Cl.

| | |
|---|---|
| *B60R 21/00* | (2006.01) |
| *B60R 21/206* | (2011.01) |
| *B60R 19/00* | (2006.01) |
| *B62D 21/02* | (2006.01) |
| *B62D 21/03* | (2006.01) |
| *B62D 21/11* | (2006.01) |
| *B62D 21/15* | (2006.01) |

(52) U.S. Cl.
CPC ............. *B60R 19/00* (2013.01); *B62D 21/02* (2013.01); *B62D 21/03* (2013.01); *B62D 21/11* (2013.01); *B62D 21/152* (2013.01); *B60R 2019/007* (2013.01)

(58) Field of Classification Search
CPC ............ B60R 21/00; B60R 21/206; B60R 2021/0009

USPC .................... 180/274; 280/743.1, 743.2
See application file for complete search history.

(56) References Cited

U.S. PATENT DOCUMENTS

| | | | |
|---|---|---|---|
| 5,452,914 A | * | 9/1995 | Hirai ................... B60R 21/23 280/743.1 |
| 8,827,356 B2 | | 9/2014 | Baccouche et al. |
| 9,004,216 B1 | | 4/2015 | Baccouche et al. |
| 9,394,005 B1 | | 7/2016 | Enders |
| 9,434,335 B2 | * | 9/2016 | Ohmura ............... B60R 21/00 |
| 9,731,673 B2 | * | 8/2017 | Le ........................ B60R 21/0136 |
| 2015/0066307 A1 | | 3/2015 | Bugelli et al. |
| 2015/0101877 A1 | | 4/2015 | Ohmura |

(Continued)

FOREIGN PATENT DOCUMENTS

| | | |
|---|---|---|
| FR | 2897813 A1 | 8/2007 |
| GB | 2532938 A | 6/2016 |

(Continued)

OTHER PUBLICATIONS

Search Report from United Kingdom Intellectual Property Office dated Apr. 26, 2018 regarding Application No. GB1719247.7 (4 pages).

*Primary Examiner* — Toan C To
(74) *Attorney, Agent, or Firm* — Frank A. MacKenzie; Bejin Bieneman PLC

(57) ABSTRACT

A vehicle includes a frame, a wheel supported by the frame; and a device fixed to the frame. The device includes an inflator and an inflatable member in fluid communication with the inflator. The inflatable member is inflatable away from the frame and into contact with the wheel to push the wheel away from the frame during sensed impact of the vehicle.

20 Claims, 7 Drawing Sheets

(56) References Cited

U.S. PATENT DOCUMENTS

| | | | |
|---|---|---|---|
| 2015/0142271 A1* | 5/2015 | Cuddihy | B60R 19/16 701/45 |
| 2015/0175110 A1* | 6/2015 | Kalandek | B60R 19/00 180/274 |
| 2015/0183395 A1* | 7/2015 | Revankar | B60R 19/40 180/274 |
| 2016/0288747 A1 | 10/2016 | Jensen et al. | |

FOREIGN PATENT DOCUMENTS

| | | |
|---|---|---|
| JP | 2005255010 A | 9/2005 |
| SE | 1300131 A1 | 8/2014 |
| WO | 2014015097 A2 | 1/2014 |

* cited by examiner

DEPLOYABLE DEVICE MOUNTED TO VEHICLE FRAME

BACKGROUND

During an offset frontal impact of a vehicle, the impact is offset from major structural components of the vehicle. Offset frontal impacts can be simulated with a small offset rigid barrier ("SORB") frontal crash test. The Insurance Institute for Highway Safety ("IIHS") sets a standard for SORB frontal crash tests. In a SORB frontal crash test, the vehicle impacts a rigid barrier at 40 miles/hour with 25% of an outer portion of a front end of the vehicle overlapping the rigid barrier.

During a SORB impact, the rigid barrier may tend to miss the major structural components of the vehicle, e.g., a frame rail. Consequently, the rigid barrier may directly impact a wheel of the vehicle, thereby pushing the wheel toward a passenger cabin of the vehicle. In such instances, the orientation of the wheel may determine the likelihood of the wheel entering into the passenger cabin, e.g., through a floor or dash of the vehicle. The wheel turned away from the frame rail of the vehicle may reduce the likelihood of the wheel entering into the passenger cabin. Intrusion of the wheel into the passenger cabin of the vehicle is a metric recorded in the IIHS SORB frontal crash test.

DETAILED DESCRIPTION

Figure 1:
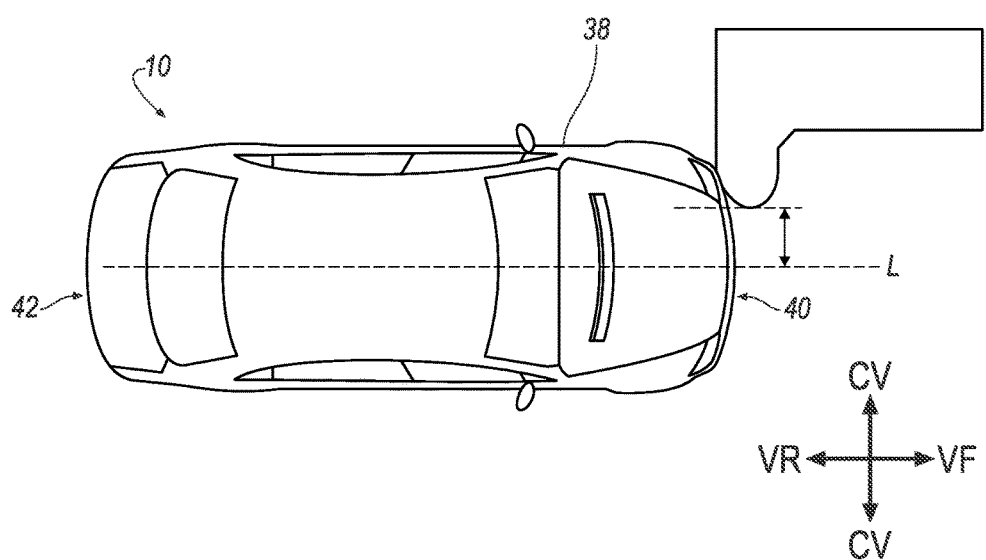
FIG. 1 is a top view of a vehicle with 25% of a front end overlapping a small offset rigid barrier.

With reference to the Figures, wherein like numerals indicate like parts throughout the several views, a vehicle 10 includes a frame 12, a wheel 14 supported by the frame 12, and a device 16 fixed to the frame 12. The device 16 includes an inflator 18 and an inflatable member 20 in fluid communication with the inflator 18. The inflatable member 20 is inflatable away from the frame 12 and into contact with the wheel 14.

Figure 2:
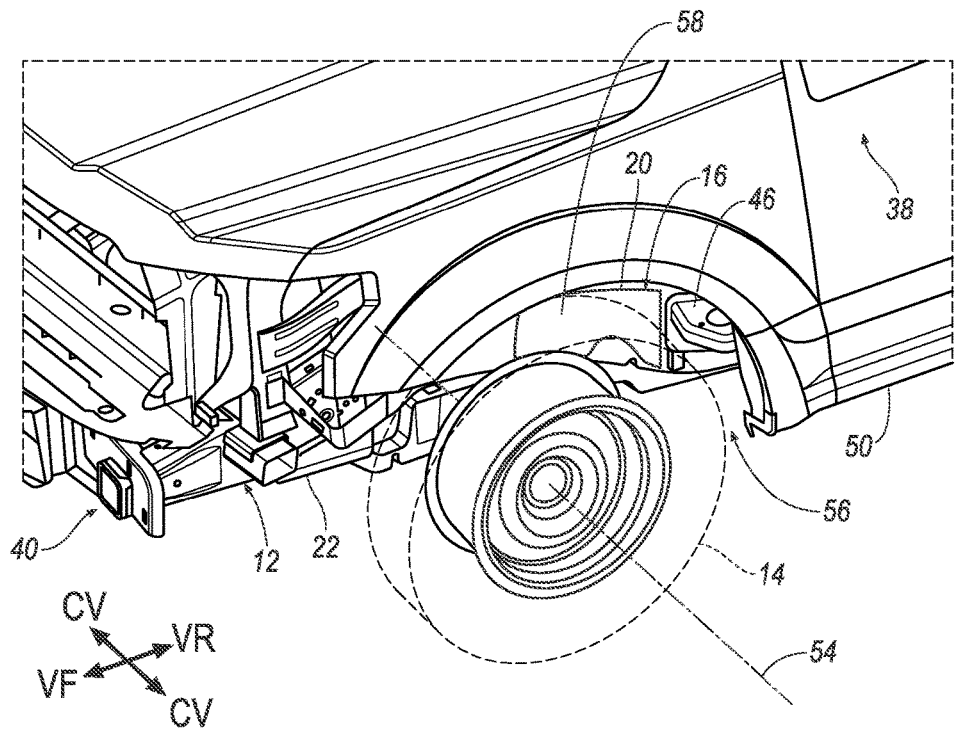
FIG. 2 is a perspective view of a portion of the vehicle including a frame, a wheel, and a device in an undeployed position fixed to the frame behind the wheel
Figure 3:
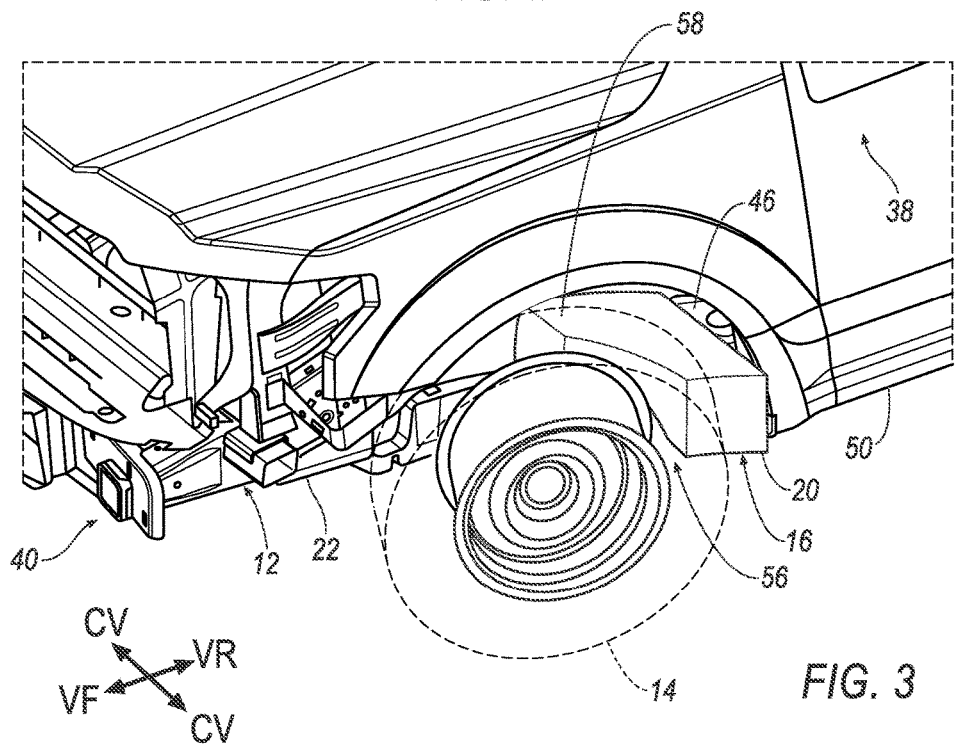
FIG. 3 is the perspective view of FIG. 2 with the device in a deployed position.

When an impact of the vehicle 10 is sensed e.g., an offset frontal impact such as a small offset rigid barrier (SORB) impact, the device 16 inflates from an undeployed position, as shown in FIG. 2, to a deployed position, as shown in FIG. 3. Specifically, the inflatable member 20 of the device 16 inflates away from the frame 12 and into contact with the wheel 14. As the inflatable member 20 contacts the wheel 14, the inflatable member 20 forces the wheel 14 away from the frame 12.

Figure 4:
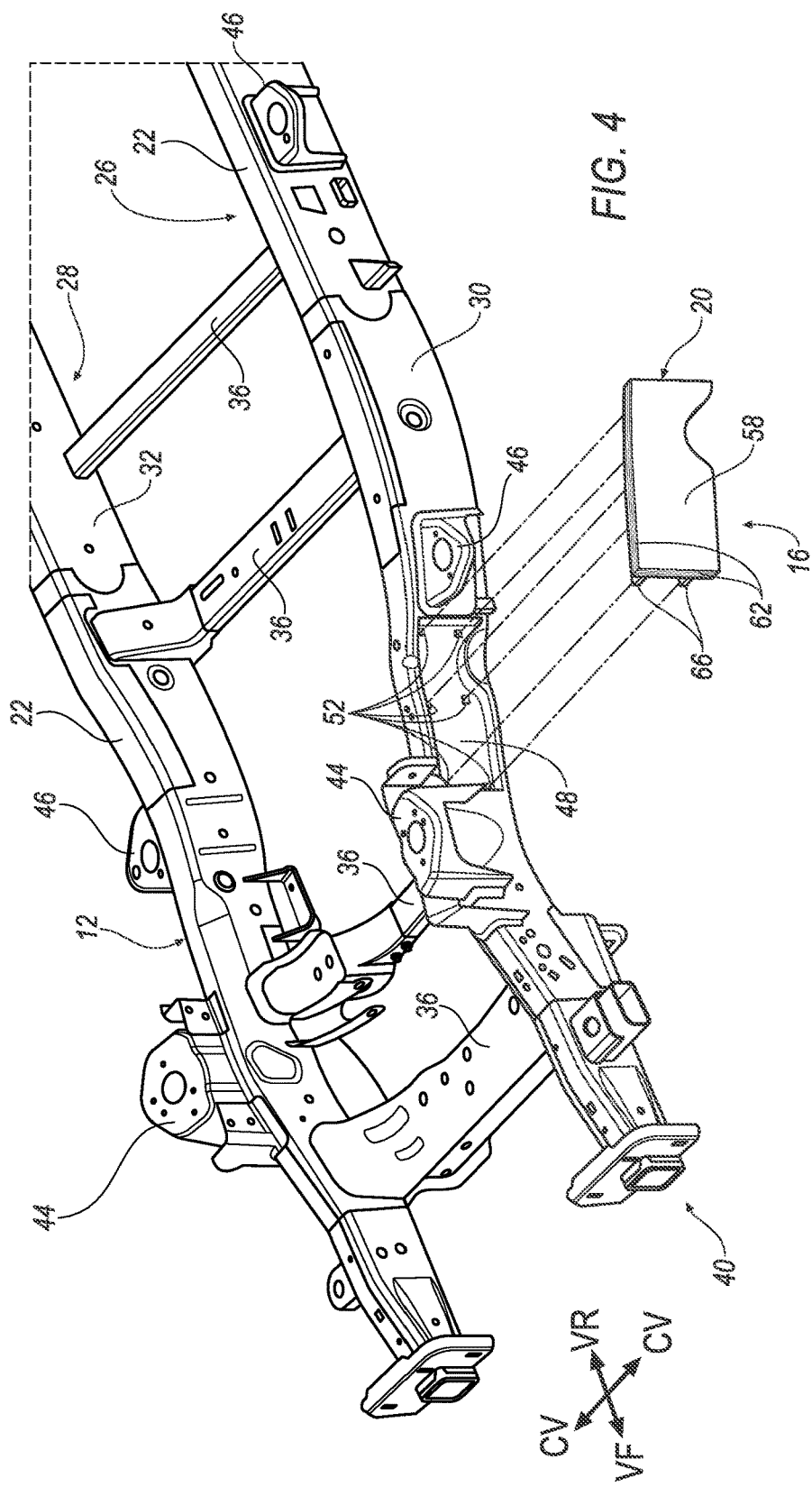
FIG. 4 is a partially-exploded perspective view of a portion of the frame including a cavity that houses the device.

With reference to FIG. 4, a frame rail 22 is elongated along a longitudinal axis L. The longitudinal axis L of the frame rail 22 may extend along the vehicle-forward direction VF and vehicle-rearward direction VR, as identified in FIG. 1.

With reference to FIG. 4, the frame 12 may include a pair frame rails 22 spaced from each other and extending generally in parallel along the vehicle-forward direction VF and vehicle-rearward direction VR. Specifically, one of the pair of frame rails may be at a left side 26 of the vehicle 10 and the other of the pair of frame rails 22 may be at a right side 28 of the vehicle 10. In the examples shown in the Figures, the device 16 is mounted to the frame rail 22 at the left side 26. In the alternative, or in addition, another device 16 may be mounted to the frame rail 22 at the right side 28. In such an example, the devices 16 may be identical, or nearly identical, and may be mirror images of each other.

The frame rails 22 have an outboard side 30 and an inboard side 32 opposite the outboard side 30. Specifically, the outboard side 30 and the inboard side 32 of each frame rail 22 oppose each other about the longitudinal axis L, i.e., are spaced from each other opposite the longitudinal axis L. The outboard side 30 and the inboard side 32 are each elongated along the longitudinal axis L. The outboard side 30 faces away from a centerline (not labelled) of the vehicle 10, as identified in FIG. 1, and the inboard side 32 faces toward the centerline of the vehicle 10.

The frame rails 22 may support other components of the vehicle 10. The frame rails 22 may be designed to absorb energy and deform in a controlled manner during a sensed impact, e.g., SORB frontal impact. The frame rails 22 may be constructed of metal (such as steel, aluminum, etc.), or any other suitable material. The frame rail 22 may be tubular, or any other suitable shape.

With reference to FIG. 4, the frame 12 includes cross-members 36 extending from one of the frame rails 22 to the other of the frame rails 22 in a cross-vehicle direction CV. The cross-members 36 may be fixed to the frame rails 22, e.g., by welding, fastening, etc. The cross-members 36 add structural rigidity to the rest of the frame 12, and may support other components. One of the cross-members 36 may be, more specifically, an engine cradle that supports components of a powertrain of the vehicle 10, e.g., the engine, transmission, etc.

A body 38 and frame 12 may have a body-on-frame construction (also referred to as a cab-on-frame construction). In other words, the body 38 and frame 12 are separate components, i.e., are modular, and the body 38 is supported on and affixed to the frame 12. As another example, the body 38 and frame 12 may be of a unibody construction. In the unibody construction, the underlying frame 12 and the body 38, including the pillars and roof rails, are unitary, i.e., a continuous one-piece unit. Alternatively, the body 38 and frame 12 may have any suitable construction. The body 38 and/or the frame 12 may be formed of any suitable material, for example, steel, aluminum, etc.

With reference to FIG. 1, the vehicle 10 may include a front bumper 40 and a rear bumper 42. The front bumper 40 and the rear bumper 42 are each supported by the frame rails 22, i.e., either directly or indirectly through an intermediate component. The front bumper 40 and the rear bumper 42 extend in the cross-vehicle direction CV. The frame rails 22 may extend continuously from the front bumper 40 to the rear bumper 42.

With continued reference to FIG. 4, the frame 12 may include a shock tower bracket 44. The shock tower bracket 44 may be supported by the frame rail 22 and, more specifically, may be fixed to the frame rail 22, e.g., by welding, fastening, etc. The shock tower bracket 44 may, for example, provide support for a suspension component, e.g., shock, strut, spring, etc. As shown in FIG. 4, the frame 12 may include two shock tower brackets 44, i.e., one on each frame rail 22.

With continued reference to FIG. 4, the frame 12 may include a cab mount bracket 46. Specifically, the cab mount bracket 46 may be fixed to the frame rail 22, e.g., by welding, fastening, etc. The cab mount bracket 46 may, for example, be fixed on either the outboard side 30 of the frame rail 22, as shown in the Figures, or the inboard side 32 of the frame rail 22. The cab mount bracket 46 supports the body 38 and may be fixed to the body 38, e.g., by a coupler (not shown) that engages the body 38 and the cab mount bracket 46, to marry the body 38 to the frame 12. The cab mount bracket 46 may be constructed of metal, e.g. steel, aluminum, etc.

The frame rail 22 may include a cavity 48 that houses the device 16. As shown in FIG. 4, the cavity 48 may be on the outboard side 30 of the frame rail 22 in the vehicle-rearward direction VR relative to the shock tower bracket 44. Specifically, the cavity 48 may be located between the shock tower bracket 44 and the cab mount bracket 46. The cavity 48 houses the device 16 in both the undeployed position and the deployed position. The cavity 48 allows the device 16 to be disposed within the cavity 48 on the frame rail 22 in an unobtrusive manner. For example, the device 16 may be flush with, or recessed relative to, the rest of the outboard side 30 when housed in the cavity 48 in the undeployed position.

The vehicle 10 may include a rocker 50, i.e., the body 38 includes the rocker 50. The rocker 50 is elongated along a second axis (not shown) parallel to the longitudinal axis L. The second axis extends along the frame 12 in the vehicle-forward direction VF and vehicle-rearward direction VR. The rocker 50 may be integral with, i.e., formed together as a single continuous unit, or formed separately and subsequently attached to the rest of the body 38. The rocker 50 is disposed along a bottom edge of the body 38.

The vehicle 10 includes the wheel 14 supported by the frame 12. The wheel 14 may be aligned with the shock tower bracket 44 along the longitudinal axis L. As shown in FIGS. 2-3, the wheel 14 may be located in the vehicle-forward direction VF relative to the rocker 50 and in the vehicle-rearward direction VR relative to the front bumper 40, i.e., a front wheel. The outboard side 30 of the frame rail 22 faces the wheel 14. The wheel 14 is rotatable about a rotational axis 54.

The body 38 of the vehicle 10 includes a wheel well 56. The wheel 14 is disposed in the wheel well 56. The device 16 is positioned in the wheel well 56. The body 38 may include cladding, e.g., formed of plastic, lining the wheel well 56. In such an example, when the device 16 is inflated, the device 16 may move and/or break through the cladding to impact the wheel 14.

Figure 5:
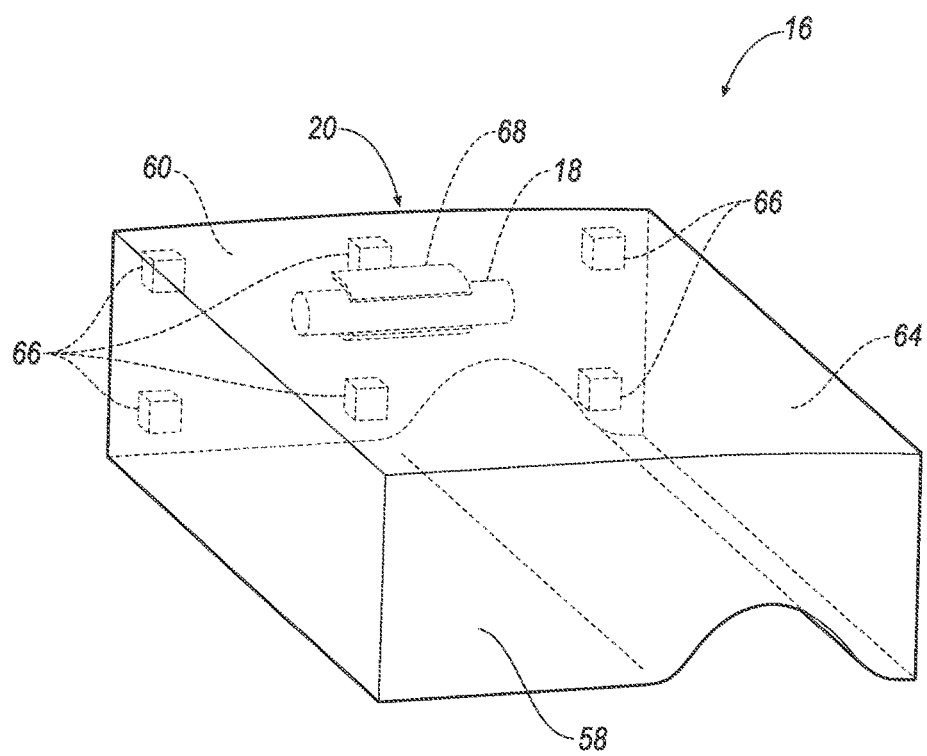
FIG. 5 is a perspective view of the device in the deployed position.
Figure 6:
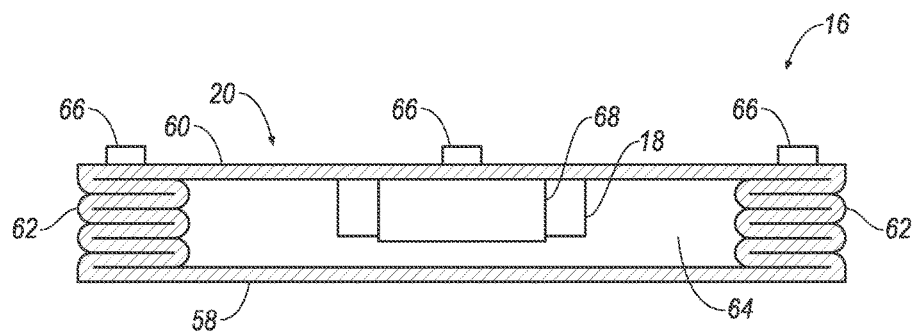
FIG. 6 is a cross-sectional view of the device in the undeployed position with an inflator disposed in an inflation chamber of an inflatable member.
Figure 7:
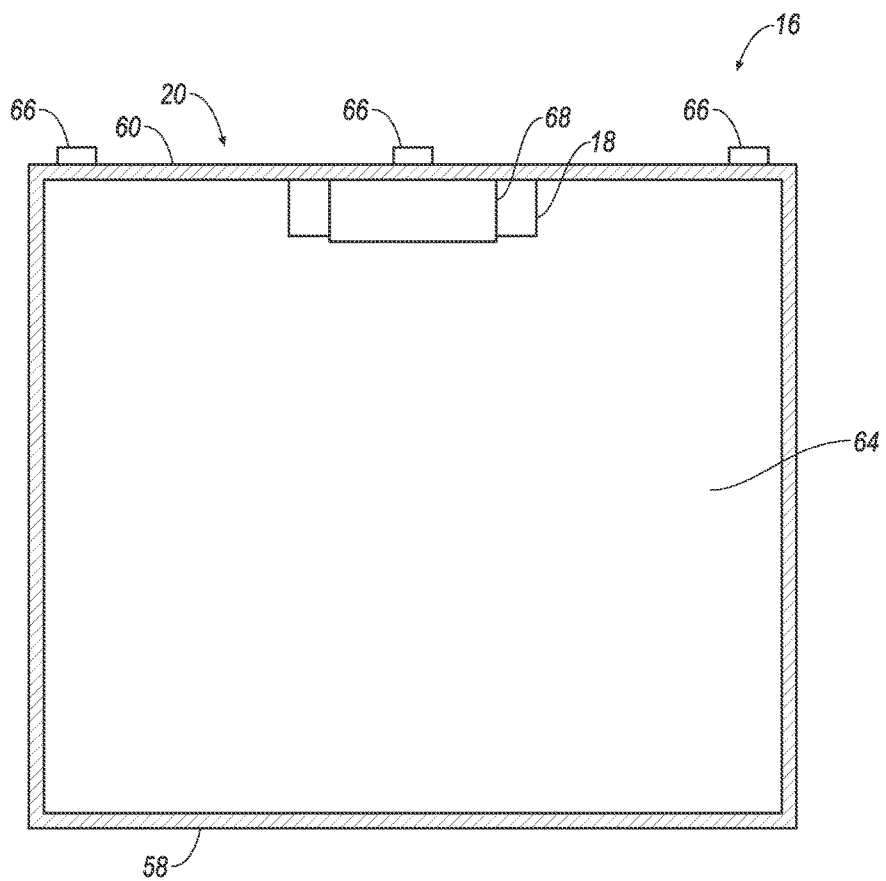
FIG. 7 is a cross-sectional view of the device in the deployed position.

With reference to FIGS. 5-7, the inflatable member 20 includes a front panel 58 and a rear panel 60. The rear panel 60 may be spaced from the front panel 58 in the undeployed position, and is spaced from the front panel 58 in the deployed position. The inflatable member 20 may include folds 62, e.g., accordion shaped folds, that are folded when the inflatable member 20 is undeployed and unfold as the inflatable member 20 is deployed. The folds 62 may extend entirely around a periphery of the device 16 from the rear panel 60 to the front panel 58.

The device 16 includes an inflation chamber 64 defined between the rear panel 60, the front panel 58, and the folds 62. The inflation chamber 64 may be inflated with an inflation medium, as set forth further below, to inflate the inflatable member 20 from the undeployed position to the deployed position.

As shown in FIG. 4, the device 16 is positioned along the frame rail 22 to contact the wheel 14 and force the wheel 14 away from the frame rail 22. The device 16 may, for example, be fixed to the outboard side 30 of the frame rail 22. The device 16 may be fixed to the frame 12 in a vehicle-rearward direction VR relative to the shock tower bracket 44. Specifically, the device 16 may be positioned in a vehicle-rearward direction VR relative to the wheel 14 along the longitudinal axis L, i.e., the device 16 may be positioned along the longitudinal axis L in a vehicle-rearward direction VR relative to the rotational axis 54 of the wheel 14. More specifically, the device 16 may, for example, be positioned along the longitudinal axis L between the rotational axis 54 and the rocker 50.

The device 16 is positioned relative to the frame rail 22, including the positioning described above, to prevent interference with the turning of the wheel 14, i.e., the turning radius as the vehicle 10 is steered, when the device 16 is in the undeployed position. In addition to the positioning described above, as also set forth above, the device 16 may be disposed in the cavity 48 of the frame rail 22. The device 16 disposed in the cavity 48 may be flush with, or recessed relative to, the rest of the outboard side 30 of the frame rail 22, i.e., a thickness of the device 16 may be less than or equal to a depth of the cavity 48.

The device 16, e.g., the inflatable member 20, may be fixed to the frame rail 22 with a fastener 66. As one example, adhesives may connect the device 16 to the frame rail 22. Specifically, the adhesive may connect the rear panel 60 of the inflatable member 20 to the frame rail 22, e.g., in the cavity 48. The adhesive may, for example, be epoxy adhesive, acrylic adhesive, etc.

Alternatively, or in addition to the adhesive, the device 16, e.g., the inflatable member 20, the fastener 66 may be pins, clips, Christmas-tree fasteners, etc., fixed to the device 16 and the frame rail 22. Specifically, fasteners 66 may be molded on the rear panel 60 of the inflatable member 20 and may be engaged with holes 52 on the frame rail 22. The fasteners 66 may be formed of the same or a different material than the rear panel 60. As one example, the fasteners 66 may be plastic.

The inflatable member 20 may be formed of a thermoplastic elastomer. The inflatable member 20 may, for example, be formed of any suitable plastic material, e.g., polypropylene (PP), polyethylene (PE) etc. The thermoplastic elastomer is a polymeric material with both thermoplastic and elastomeric properties. A suitable class of TPE material may, for example, be thermoplastic olefin (TPO). The properties of the plastic material of the inflatable member 20 allow the inflatable member 20 to extend from the frame 12 to the deployed position toward the wheel 14. The thermoplastic elastomer may be 1-4 millimeters thick. The manufacturing flexibility afforded by the plastic material may allow the inflatable member 20 to be formed, e.g., blow molded, injection molded, etc., into any suitable shape, size, and thickness.

Figure 8:
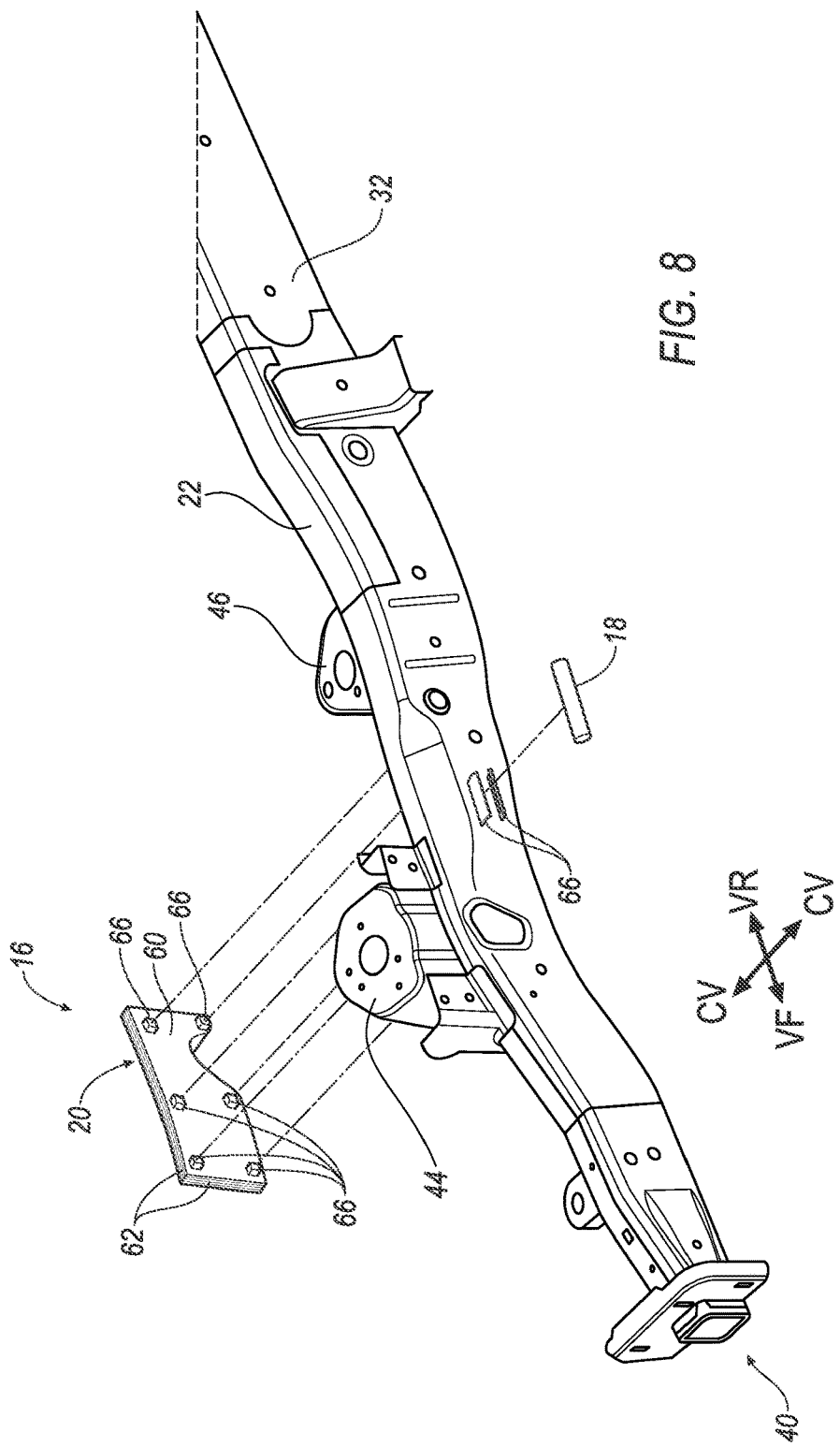
FIG. 8 is a perspective view of a portion of an inboard side of the frame with the device fixed to an outboard side of the frame and the inflator fixed to the inboard side of the frame.

With reference to FIGS. 4-9, the device 16 includes the inflator 18. The inflator 18 may be in fluid communication with the inflatable member 20 such that the inflator 18 inflates the inflatable member 20. The inflator 18 may be located inside or outside the device 16, i.e. inflatable member 20. As one example, as shown in FIG. 8, the inflator 18 may be fixed on the inboard side 32 of the frame rail 22 and be in fluid communication with the inflatable member 20 through a fill tube 78. The fill tube 78 may, for example, pass through the frame rail 22 connecting the inflator 18 to the inflatable member 20. Alternatively, or in addition to, the fill tube 78 may pass over and/or under the frame rail 22.

As another example, the inflator 18 may be disposed in the inflation chamber 64. In this configuration, for example, the device 16 may define at least one clip 68 in the inflation chamber 64 that fixes the inflator 18 to the inflatable member 20. The clip 68 may be of any suitable size and shape to fix the inflator 18 to the inflatable member 20. The clip 68 may, for example, be integral with the front panel 58, rear panel 60, as shown in FIGS. 5-7), and/or folds 62, i.e., formed simultaneously with the front panel 58, rear panel 60, and/or folds 62 as a single continuous unit. Alternatively, the clip 68 may be formed separately from and subsequently connected to the front panel 58, rear panel 60, and/or folds 62.

Upon receiving a signal from, e.g., a controller 70, the inflator 18 may inflate the inflation chamber 64 with an inflation medium, such as a gas. The inflator 18 may be, for example, a pyrotechnic inflator that uses a chemical reaction to drive inflation medium to the inflatable member 20. The inflator 18 may be of any suitable type, for example, a cold-gas inflator.

The device 16 may include a cover (not shown). The cover may partially or entirely cover the inflatable member 20 to protect the inflatable member 20 from the elements, e.g., rain, snow, road salt, etc. The cover may be formed of any suitable material that is resistant to the elements. The cover may be frangible relative to the inflatable member 20 so that the inflatable member 20 breaks the cover when the device 16 is deployed. The cover may include a tear seam (not shown) that encourages the cover to rupture during deployment of the device 16 to the deployed position.

Figure 9:
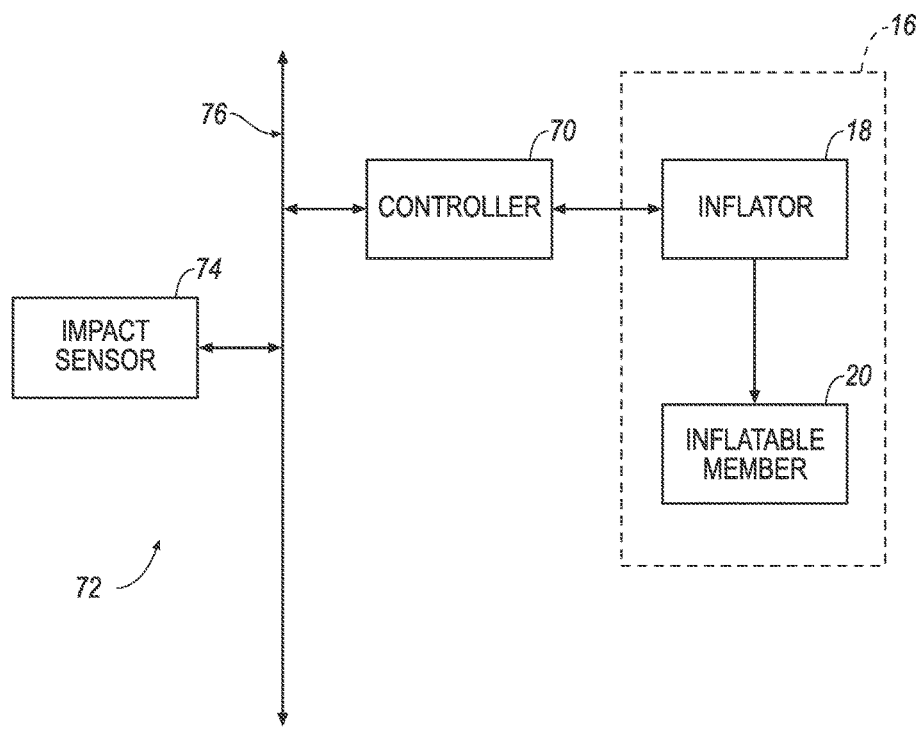
FIG. 9 is a block diagram of a control system of the vehicle.

With reference to FIG. 9, the vehicle 10 may include a control system 72 having the controller 70 in communication with the inflator 18 and/or an impact sensor 74. The controller 70, the inflator 18, and the impact sensor 74 may communicate through a communications network 76.

The controller 70 may be a microprocessor-based controller. The controller 70 may include a processor, memory, etc. The memory of the controller 70 may store instructions executable by the controller 70.

The impact sensor 74 may be in communication with the controller 70. The impact sensor 74 is adapted to detect an impact, e.g., offset frontal impact, to the vehicle 10. The impact sensor 74 may be of any suitable type, for example, post-contact sensors such as accelerometers, pressure sensors, contact switches; and pre-impact sensors such as radar, LIDAR, and vision-sensing systems. The vision-sensing system may include one or more cameras, CCD image sensors, CMOS image sensors, etc. The impact sensor 74 may be located at numerous points in or on the vehicle 10.

The control system 72 may transmit signals through the communications network 76 (such as a controller area network (CAN) bus), Ethernet, and/or by any other wired or wireless communication network.

As shown in FIG. 9, in response to an impact of the vehicle 10 with another object, e.g., an offset impact, the impact sensor 74 may transmit an instruction through the communications network 76 to the controller 70. The controller 70 may be programmed to instruct the device 16, i.e., inflator 18, to inflate the inflatable member 20. As set forth above, the inflatable member 20 is inflatable away from the frame rail 22 and into contact with the wheel 14 to force the wheel 14 away from the frame rail 22. The position of the wheel 14 facing away from the frame 12 may reduce the likelihood of the wheel 14 entering into the passenger cabin of the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a frame;
   a wheel supported by the frame; and
   a device fixed to the frame, the device including an inflator and an inflatable member in fluid communication with the inflator, the inflatable member being inflatable away from the frame and into contact with the wheel;
   wherein the frame includes a frame rail having an outboard side, the outboard side facing the wheel, the device being on the outboard side; and
   wherein the frame rail includes an inboard side opposite the outboard side, the inflator is mounted on the inboard side.

2. The vehicle as set forth in claim 1, further comprising a shock tower bracket supported by the frame, wherein the device is fixed to the frame in a vehicle-rearward position relative to the shock tower bracket.

3. The vehicle as set forth in claim 1, wherein the wheel is rotatable about a rotational axis, the device mounted along the frame in a vehicle-rearward direction relative to the rotational axis.

4. The vehicle as set forth in claim 3, further comprising a rocker, wherein the device is mounted along the frame between the rotational axis and the rocker.

5. The vehicle as set forth in claim 1, wherein the inflatable member is formed of a thermoplastic elastomer.

6. The vehicle as set forth in claim 5, wherein the thermoplastic elastomer is 1-4 millimeters thick.

7. The vehicle as set forth in claim 1, wherein the inflatable member is adhered to the frame.

8. The vehicle as set forth in claim 1, further comprising a controller, the controller programmed to instruct the inflator to inflate the inflatable member in response to an offset impact of the vehicle with another object.

9. The vehicle as set forth in claim 1, further comprising a cab mount bracket fixed to the frame and a vehicle body supported on the cab mount bracket.

10. A vehicle frame, comprising:
    a frame rail;
    a shock tower bracket supported by the frame rail; and
    a device fixed to the frame rail in a vehicle-rearward position relative to the shock tower bracket, the device including an inflator and an inflatable member in fluid communication with the inflator and inflatable away from the frame rail;
    wherein the frame rail is elongated along a longitudinal axis and has an outboard side and an inboard side opposing each other about the longitudinal axis, wherein the device mounted being on the outboard side and the inflator is mounted to the inboard side.

11. The vehicle frame as set forth in claim 10, further comprising a shock tower bracket supported by the frame rail, wherein the device is fixed to the frame in a vehicle-rearward position relative to the shock tower bracket.

12. The vehicle frame as set forth in claim 10, wherein the inflatable member is formed of a thermoplastic elastomer.

13. The vehicle frame as set forth in claim 12, wherein the thermoplastic elastomer is 1-4 millimeters thick.

14. The vehicle frame as set forth in claim 10, wherein the inflatable member is adhered to the frame rail.

15. The vehicle frame as set forth in claim 10, wherein the frame rail includes a cavity, the device disposed in the cavity.

16. A vehicle, comprising:
a frame;
a wheel supported by the frame; and
a device fixed to the frame, the device including an inflator and an inflatable member in fluid communication with the inflator, the inflatable member being inflatable away from the frame and into contact with the wheel;
wherein the inflatable member is adhered to the frame.

17. The vehicle as set forth in claim 16, wherein the inflatable member is formed of a thermoplastic elastomer.

18. The vehicle as set forth in claim 16, wherein the inflatable member includes an inflation chamber and the inflator is disposed in the inflation chamber.

19. The vehicle as set forth in claim 16, wherein the wheel is rotatable about a rotational axis, the device mounted along the frame in a vehicle-rearward direction relative to the rotational axis.

20. The vehicle as set forth in claim 19, further comprising a rocker, wherein the device is mounted along the frame between the rotational axis and the rocker.

* * * * *